July 19, 1966  R. F. SPARK  3,261,961
APPARATUS FOR ARC WELDING AND SIMILAR PROCESSES
Filed Dec. 7, 1964  2 Sheets-Sheet 1

INVENTOR
RONALD FRANCIS SPARK
BY Townshend & Meserole
ATTORNEY

United States Patent Office 3,261,961
Patented July 19, 1966

3,261,961
APPARATUS FOR ARC WELDING AND SIMILAR PROCESSES
Ronald Francis Spark, London, England, assignor to The British Oxygen Company Limited, a British Company
Filed Dec. 7, 1964, Ser. No. 416,551
5 Claims. (Cl. 219—75)

This invention relates to apparatus for gas shielded arc welding and similar processes, such as hard facing processes carried out by metal deposition. The term "gas shielded arc welding apparatus" as used hereinafter is intended to include all such apparatus.

The current capacity of arc welding apparatus is to large extent determined by the rate at which heat can be dissipated from the arc welding gun or torch. Apparatus for use at up to two or three hundred amperes normally makes use of natural cooling whereas for welding currents in excess of these values it is the practice to pass cooling water through the apparatus.

Some difficulties and dangers are experienced in the supply and use of cooling water with portable arc welding apparatus, and it is an object of the invention to provide welding apparatus which can be operated at higher welding currents than existing apparatus using natural cooling and yet does not necessitate the use of cooling water.

According to the present invention, in gas shielded arc welding apparatus having a tubular member surrounding the welding electrode adapted to direct shielding gas around a welding arc established at the tip of the electrode, means are provided for causing at least a portion of the shielding gas to flow along a circuitous path in contact with the tubular member before being directed at the arc.

The said tubular member will normally be coaxial with the electrode, and may comprise a barrel section terminating in a detachable nozzle. The shielding gas, or a portion thereof, may be caused to flow in an annulus between the tubular member and an inner liner.

The circuitous path for the shielding gas, may be in the form of a helix coaxial with the electrode. Conveniently this may be formed between an internal screw in the barrel and a closely fitting liner inside; alternatively an externally screw threaded liner may be closely fitted within a plain bored barrel.

In the case of a gas shielded consumable electrode welding torch having a guide tube or contact tube for a wire electrode supported by a collet or like device, the portion of the barrel in which the circuitous path is formed may extend between the collet or like device and the nozzle.

Two embodiments of the invention will now be described by way of example with reference to the accompanying drawings in which.

Figure 1:
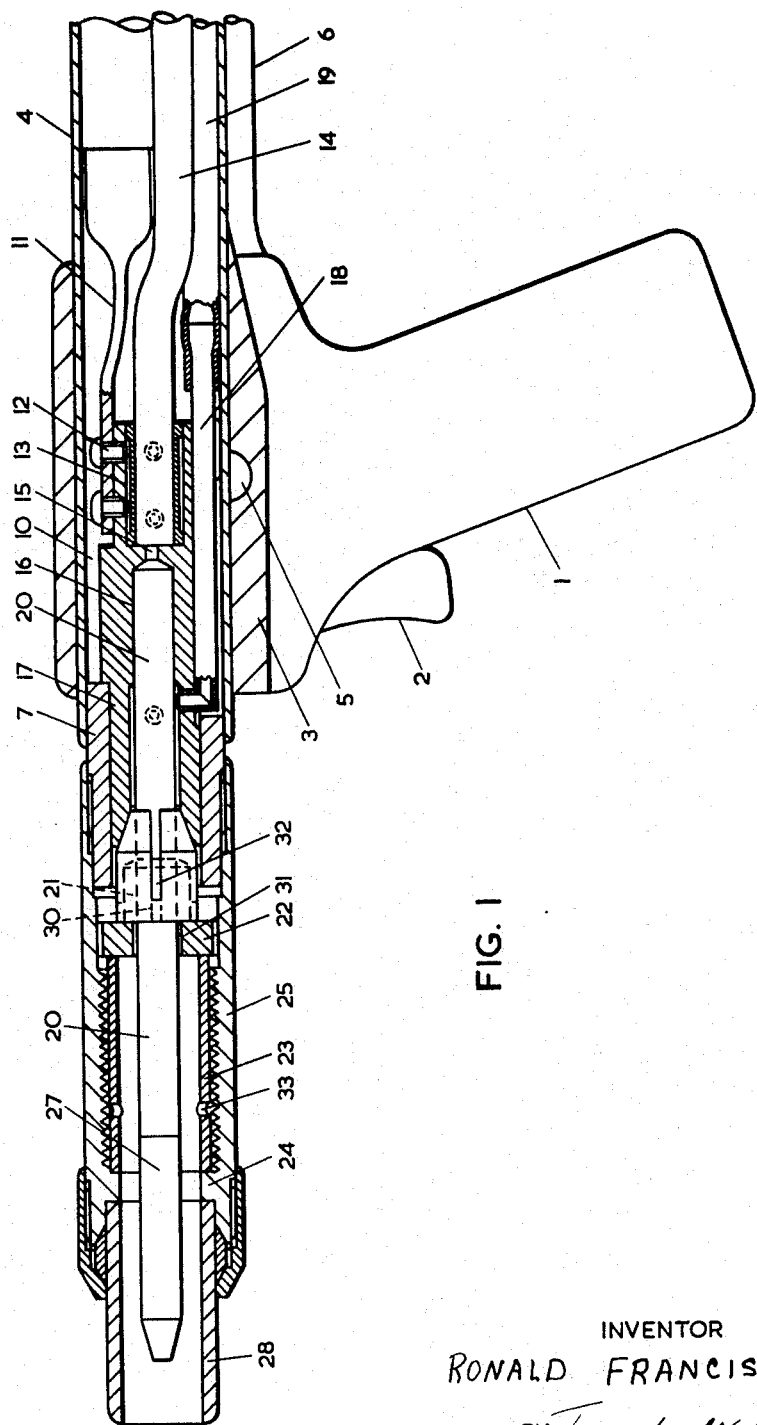
FIGURE 1 is a sectional view of a welding gun for gas shielded consumble electrode arc welding incorporating a first embodiment of the invention.

Referring to FIGURE 1, the welding gun has a handle 1, which incorporates a trigger switch 2 and a tubular banjo portion 3 in which is removably located an outer casing 4 of insulating material. The casing 4 is normally secured in the banjo portion 3 by a cotter pin 5, which may be removed to allow adjustment of the handle position or to allow the removal of the handle for replacement or for mounting the gun on a welding carriage without the handle. The switch 2 controls the welding power supply and the electrode feed by means of a cable 6. This is attached to the handle 1 and is removable therewith since it is not required when the gun is mounted on an automatic welding carriage.

The casing 4 is secured at one end to a sleeve 7, within which is secured a body member 10 of conductive material extending into the casing 4 but spaced therefrom. To the inner end of the body member 10 is attached a power supply cable 11 by means of clamping screws 12. An axial socket 13 in the body member adjacent to the cable attachment point receives the end of the electrode guide conduit 14. An axial drilling 15 connects the socket 13 with a coaxial socket 16 having a portion 17 of enlarged diameter. A radial port leading into portion 17 receives the angled end of a gas inlet tube 18, which is connected to a flexible conduit 19 through which shielding gas is supplied to the welding gun.

The socket 16 is sized so as to be a close fit over the end of an electrode guide tube 20, which is secured in place by a collet 21 located in a seating formed in the mouth of the socket 16. The collet 21 is urged to grip the guide tube 20 by a collet washer 22, which itself is axially urged by a liner 23 retained by an internal flange 24 in a barrel 25. The liner 23 is a close fit within an internal screw thread in the barrel 25. The barrel 25 screws on to the end of sleeve 7 which protrudes from the body member 4, and on being screwed into place the liner 23 and the washer 22 are both urged inwards to retain the collet 21 and cause this to grip the electrode guide tube. The guide tube has at its outer end a screwed socket (not shown) in which is fitted a contact tube 27 having an internal bore of diameter appropriate to the gauge of electrode wire to be used. The barrel 25 has at its outer end a detachable nozzle 28.

The feature of securing the guide tube 20 by means of the collet 21 allows the electrode guide tube to be axially adjusted after unlocking the collet by partially unscrewing the barrel 25 from the sleeve 6. This enables the adjustment to be effected without tools, which is particularly useful where it is necessary to change from one technique of welding, such as short-arc welding, to spray transfer welding, where different nozzle to contact tube distances are required.

In flowing from the annular space around the guide tube 20 within the enlarged portion 17 of the socket 16, to its eventual discharge from the nozzle 28, the shielding gas is divided into two paths. The first path is provided by slots 30 in the collet 21, which allow a leakage of gas along the outside of the guide tube 20 through a clearance 31 between the guide tube and the washer 22 and thence towards the nozzle. The second path is a circuitous path via the main slits 32 in the collet, around the outside of the washer 22 which is square in form to allow for substantial flow, and along the helical path between the liner 23 and the internal screw thread of the barrel 25, thence issuing by radial ports 33 in the liner 23 to rejoin the gas flowing along the first path.

As a further measure to prevent overheating the torch body parts are made of materials of good heat conductivity; in this embodiment aluminum alloy was used for the barrel 25 and the liner 23.

Tests were carried out to compare the temperature reached by the nozzle and barrel of this welding gun with those measured when using a similar welding gun in which all the gas was directed axially around the guide tube and contact tube. At 375 amperes of welding current and at 33 arc volts with a shielding gas of $CO_2$ flowing at 45 cubic feet per hour through the welding gun it was found that in the gun incorporating the invention the temperature of the nozzle was 60° C. lower, and that of the barrel was 30° C. lower.

In the second embodiment of the invention, shown in

Figure 2:
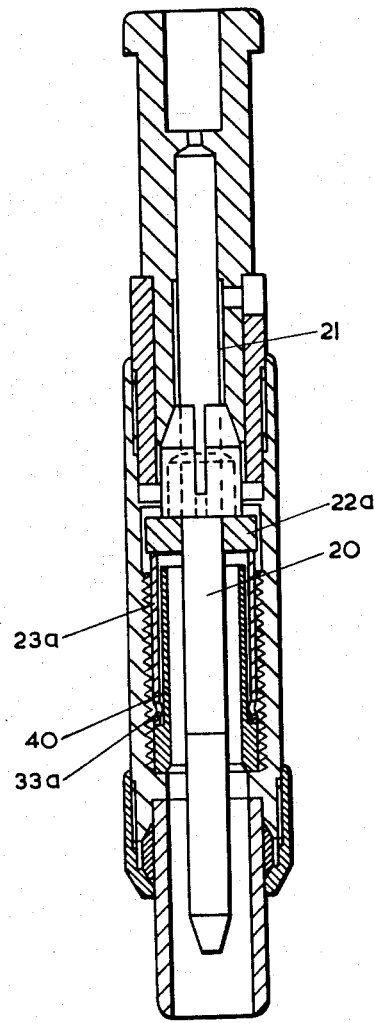
FIGURE 2 is a sectional view of an assembly which may be substituted for a corresponding assembly shown in FIGURE 1 and which incorporates a second embodiment of the invention.

FIGURE 2, the collet locking washer 22a is a relatively tight fit on the electrode guide tube 20 thus causing substantially all of the shielding gas to flow through the helical passage between the inner face of the outer barrel 25 and a modified liner 23a. Radial ports 33a in the liner 23a allow the gas to pass into an annular space between the liner 23a and an inner tube 40, the outlet from this annular space being adjacent to the locking washer 22a. In operation substantially all the shielding gas flows around the washer 22a through the helical passage and the radial ports 33a, and has its axial component of velocity twice reversed in direction by passing between the liner 23a and the tube 40 and then out through the nozzle 28.

It will be appreciated that the invention is equally applicable to gas shielded arc welding torches of the MIG type through which a consumable wire electrode is fed and to torches of the TIG type in which the electrode is of a relatively non-consumable material such as a tungsten rod.

I claim:
1. In gas shielded arc welding apparatus having a tubular member in the form of a barrel surrounding the welding electrode and terminated by a nozzle, for directing shielding gas around a welding arc established at the tip of the electrode, the improvement which comprises means operative to cause at least a portion of the shielding gas to flow along a circuitous path in contact with the tubular member in an annular space between the tubular member and an inner liner before being directed around the welding arc.

2. Gas shielded arc welding apparatus according to claim 1, in which the circuitous path is in the form of a helix coaxial with the electrode.

3. Gas shielded arc welding apparatus according to claim 2, in which the circuitous path in the form of a helix is formed between a internal screw thread on the barrel and the close-fitting cylindrical surface of the inner liner.

4. Gas shielded arc welding apparatus according to claim 1, in which at least a portion of the shielding gas is caused to flow so that the axial component of the flow velocity is twice reversed in direction before the gas leaves the nozzle.

5. Gas shielded arc welding apparatus according to claim 4, in which the gas flow is reversed by a further tubular member within the inner liner.

References Cited by the Examiner
FOREIGN PATENTS
556,002    4/1957    Belgium.

RICHARD M. WOOD, *Primary Examiner.*